L. WAGNER.
Glass Sirup-Pitcher.

No. 161,364. Patented March 30, 1875.

Witnesses: Charles G. Page. Claudius L. Parker.
Inventor: Louis Wagner, by George H. Christy, his atty.

UNITED STATES PATENT OFFICE.

LOUIS WAGNER, OF WHEELING, WEST VIRGINIA, ASSIGNOR TO J. H. HOBBS, BROCKUNIER & CO., OF SAME PLACE.

IMPROVEMENT IN GLASS SIRUP-PITCHERS.

Specification forming part of Letters Patent No. 161,364, dated March 30, 1875; application filed February 1, 1875.

*To all whom it may concern:*

Be it known that I, LOUIS WAGNER, of Wheeling, county of Ohio, State of West Virginia, have invented or discovered a new and useful Improvement in Sirup-Pitchers; and I do hereby declare the following to be a full, clear, concise, and exact description thereof, reference being had to the accompanying drawing making a part of this specification, in which—like letters indicating like parts—

Figure 1:
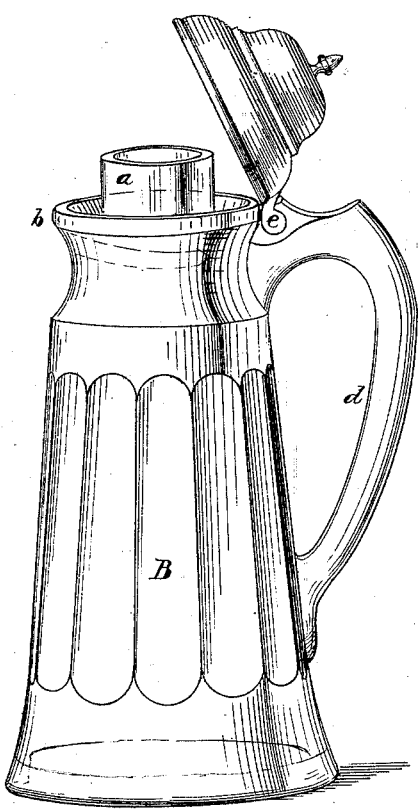
Figure 2:
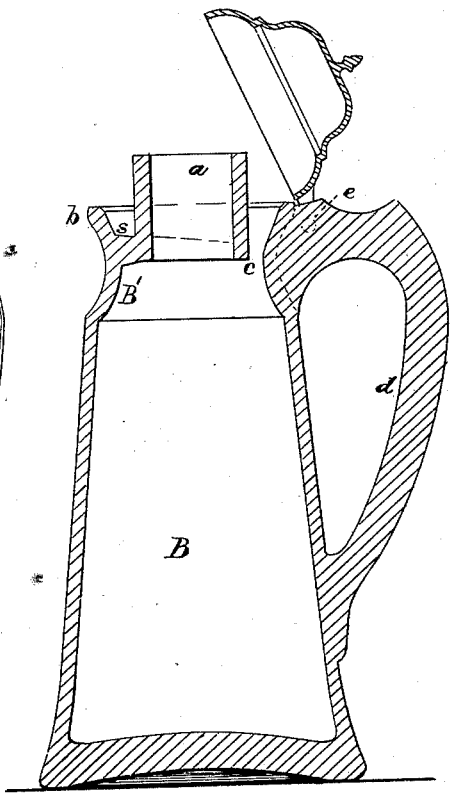
Figure 3:
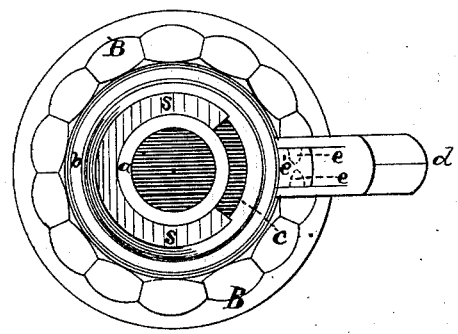

Figure 1 is a side elevation of my improved pitcher with the lid raised. Fig. 2 is a vertical sectional view thereof, and Fig. 3 is a top end view of the pitcher without the lid.

Sirup-pitchers having a central pouring spout or lip, surrounded by an annular drip-cup, have heretofore been made of metal throughout, and the body, pouring-spout, and neck have been made of glass and combined with a metallic top which formed the lid, and, in connection with a shoulder on the neck, also formed a drip-cup. As the metallic parts are somewhat costly, and more troublesome than glass to keep clean, I have devised a pitcher of the kind referred to, made wholly of glass, except the lid and one-half the hinge, and in such manufacture, substantially as hereinafter described and claimed, consists the nature of my invention.

My improved pitcher is made by pressing in suitably-formed molds in the manner ordinarily practiced in the manufacture of pressed glassware. The body B is pressed in an inverted position in a jointed or two-part mold, the plunger passing through the bottom. The lower parts of the mold are so shaped and disposed with reference to each other as to give cavities suitable for the formation in this way of a pouring-spout, $a$, and an annular inwardly-sloping drip-cup, $b$, surrounding it at its base, and also so as to give only a comparatively thin film of glass over the outer or extreme end of the pouring-spout, and likewise a thin film of glass in the bottom of the drip-cup $b$ at the side of the spout $a$, opposite its pouring side, as at $c$. The handle $d$ is made at the same time, and at its upper end, at or near where it joins the pitcher, a small shallow socket, $e$, is made on each side by suitable teats in the mold, so that corresponding teats on the fork of the half-hinge $e'$ may be sprung or otherwise secured therein, and so make a hinge for the cap D, which latter, when in position, rests on the outer edge of the drip-cup $b$. But other suitable mode of hinging may be employed. After the article is thus pressed, the film that covers the mouth of the pouring-spout $a$ is broken off, and the end of the mouth properly ground, or, by heating, otherwise finished, and the film that closes the drip-opening $c$ is also knocked out either before or after annealing.

The bottom is formed in any suitable manner, either by closing up, as heretofore practiced in the making of inkstands, pressed bottles, &c., or, preferably, by welding thereto a plate of glass of suitable diameter while in a plastic or semi-plastic state, after which the bottom is heated and finished, and the pitcher is properly annealed. But this mode of making the bottom, being the invention of another, is not claimed herein. The cap is then attached as above described, and the pitcher is complete.

In the form of pitcher shown, (which I consider the best form,) it will be observed that the drip-cup $b$ rises directly from and flares out from the neck B' of the pitcher; that the bottom of the drip-cup consists of a flange, $s$, projecting inwardly, and sloping in the direction of its length from the pouring-side of the pitcher downward around to the drip-opening $c$; and that the spout $a$ rises directly from the inner edge of this flange. But these details may be varied within the general description above given; and the sockets or recesses $e$, instead of being made in the handle proper, may be made in any extension on or outside the pitcher proper, and such means for attaching hinged caps or lids may be advantageously used with other kindred articles of glassware.

What I claim as my invention, and desire to secure by Letters Patent, is—

1. A glass sirup-pitcher, having a body, B, a pouring-spout, $a$, and flaring drip-cup $b$, all made at the same operation and in one piece, and provided with a drip-opening, $c$, substantially as set forth.

2. A glass pouring spout or lip, $a$, and flaring drip-cup $b$, made in one piece, the juncture of the two forming a sloping bottom, which leads back to a drip-opening, *c*, substantially as set forth.

3. As a means of attaching a lid, the sockets or recesses *e* in the sides of the handle, or other projection from the cylindrical part of the pitcher, substantially as set forth.

In testimony whereof I have hereunto set my hand.

LOUIS WAGNER.

Witnesses:
J. H. HOBBS,
CHAS. W. BROCKUNIER.